July 4, 1961
L. SLEGER
2,991,118
TAIL GATE STEP
Filed May 1, 1959
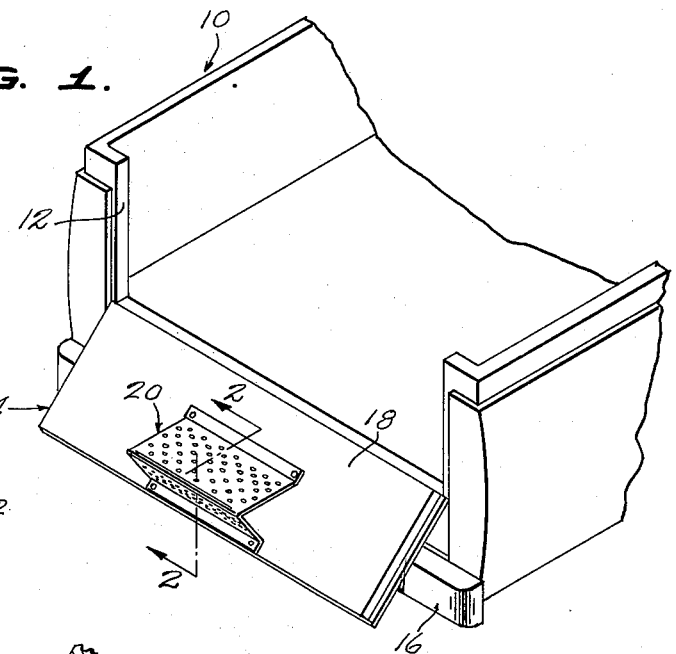
FIG. 1.
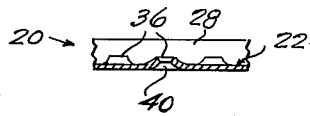
FIG. 3.
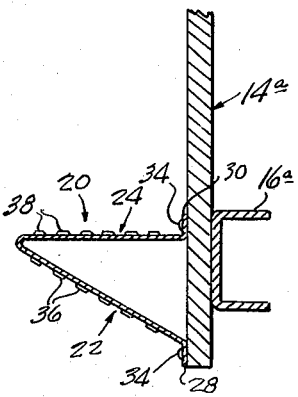
FIG. 2.
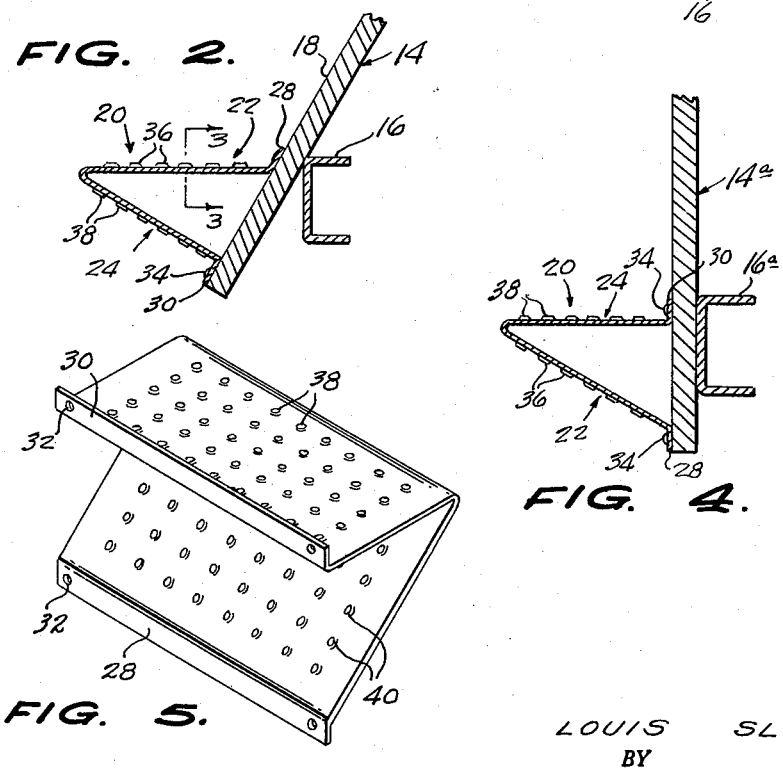
FIG. 4.
FIG. 5.
INVENTOR.
LOUIS SLEGER,
BY
McMorrow, Berman + Davidson
ATTORNEYS.

2,991,118
TAIL GATE STEP
Louis Sleger, Cato, Wis. (Rte. 1, Whitelaw, Wis.)
Filed May 1, 1959, Ser. No. 810,418
2 Claims. (Cl. 296—62)

This invention relates to a safety step for installation on truck tail gates.

The primary object of the invention is to provide an efficient, non-skid, and easily installed step of the character indicated which provides a safe platform on truck tail gates, when such gates are open, to stand on while reaching into a truck.

Another object of the invention is to provide a single, preferably one-piece step of the character indicated above which is to be mounted on the inner or front side of a tail gate and is out of sight within the truck body while the tail gate is closed.

A further object of the invention is to provide a step of the character indicated above which is reversibly attachable to tail gates which, in their open positions, depend perpendicularly or at an angle from the truck body, so as to provide a horizontal standing platform in either case.

Other important objects and advantageous features of the invention will be apparent from the following description and the accompanying drawings, wherein, for purposes of illustration only, a specific form of the invention is set forth in detail.

In the drawings:

FIGURE 1 is a fragmentary rear perspective view of a pick-up truck, its tail gate being open and depending therefrom at an angle, and being equipped with a safety step in accordance with the present invention;

FIGURE 2 is an enlarged fragmentary vertical section taken on the line 2—2 of FIGURE 1;

FIGURE 3 is a further enlarged fragmentary vertical section taken on the line 3—3 of FIGURE 2;

FIGURE 4 is a fragmentary vertical section, similar to FIGURE 2, showing the step attached in reversed position on a tail gate which, in open position, is in a perpendicular position; and FIGURE 5 is a further enlarged perspective view of the step per se.

Referring in detail to the drawings, wherein like numerals designate like parts throughout the several views, the numeral 10 generally designates a pick-up truck body having an open rear end 12 which is normally closed by a tail gate 14 which is hinged to swing rearwardly and downwardly to an open position. In the open position the tail gate is supported at a rearward angle by its engagement with the rear bumper 16 of the body 10, so that the inner or front surface 18 of the tail gate is at a rearwardly declining angle.

In accordance with the present invention, reaching forwardly through the open rear end 12 of the truck body 10 is facilitated and rendered safer by the attachment on the front tail gate surface 18 of a safety step, generally designated 20. The safety step 20 preferably comprises a one-piece and preferably stiff sheet metal form of V-shaped form, providing two alternately available first and second standing platforms 22 and 24, respectively, which terminate at their free edges, remote from the open portion 26 connecting the platform, in oppositely and outwardly directed attaching flanges 28 and 30, respectively, having bolt or screwholes 32 therein. The platforms are flat and are acutely angled relative to each other, and the first platform 22 is sufficiently wider than the second platform 24 that, in the case of an angled tail gate 14, as shown in FIGURES 1 and 2, the first platform 22 is uppermost and in a horizontal position; and in the case of a perpendicular tail gate 14a, the second platform 24 is uppermost and in a horizontal position, as shown in FIGURE 4. The attaching flanges 28 and 30 are readily bendable to assume the angles thereof relative to the platforms, required by the alternative installations of the step 20. Bolts or screws 34 are extended through the flange holes 32 and secured in the related tail gate to secure the step 20 in place thereon.

While not shown in the drawings, the closing of either of the tail gates 14, 14a puts the step 20 within the truck body 10 in an out-of-the-way position, so that when a tail gate is closed, the step does not project from the tail gate or behind the truck body 10.

As clearly shown in the drawings, the platforms 22 and 24 are of non-skid character to prevent slipping while standing thereon, and this is preferably obtained by punching out rows of holes through the material of the platforms in such a way as to provide annular projections 36 and 38 on the outward or stand-on side of the platforms 22 and 24, respectively. The holes 40 which the non-skid projections surround serve to pass through the platforms debris which may be on the shoe soles of the user, whereby accumulations thereof on the stand-on surfaces are minimized.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a hinged truck body tail gate normally occupying a perpendicular position when closed and adapted to assume a pendant position when open, said tail gate having a front side which faces forwardly of the body in the closed position of the tail gate, and a step fixed to and extending from said front side, said step comprising a V-shaped body elongated in the direction of the width of the tail gate, said body having a first plate and a second plate, said plates having free edges which are fixed to said front side at vertically spaced points, said first and second plates being fixed together at the apex of the body and being angled relative to each other, said first plate being horizontal in the open position of the gate, and said second plate being horizontal in the closed position of the gate.

2. In combination, a hinged truck body tail gate normally occupying a perpendicular position when closed and adapted to assume a pendant positioned when open, said tail gate having a front side which faces forwardly of the body in the closed position of the tail gate, and a step fixed to and extending from said front side, said step comprising a V-shaped body having a first plate and a second plate, said plates having free edges which are fixed to said front side at vertically spaced points, said first and second plates being fixed together at the apex of the body and being angled relative to each other, said first plate being horizontal in the open position of the gate, and said second plate being horizontal in the closed position of the gate, said tail gate being angled relative to the perpendicular in its open position, said second plate being narrower than said first plate and disposed at an acute angle to the first plate.

(References on following page)

References Cited in the file of this patent

UNITED STATES PATENTS

| | | |
|---|---|---|
| 1,172,227 | Schade | Feb. 15, 1916 |
| 1,181,367 | Bourgon | May 2, 1916 |
| 1,355,408 | Moody | Oct. 12, 1920 |
| 1,427,030 | Stephens et al. | Aug. 22, 1922 |
| 1,562,965 | Hubschmitt | Nov. 24, 1925 |
| 1,586,421 | Frush | May 25, 1926 |
| 2,333,849 | Driscoll | Nov. 9, 1943 |
| 2,906,485 | Dakin | Sept. 29, 1959 |

FOREIGN PATENTS

| | | |
|---|---|---|
| 797,496 | Great Britain | July 2, 1958 |